US012271729B2

(12) United States Patent
Langefeld et al.

(10) Patent No.: US 12,271,729 B2
(45) Date of Patent: Apr. 8, 2025

(54) PROGRESSIVE DELIVERY OF CLUSTER INFRASTRUCTURE UPDATES

(71) Applicant: GM Cruise Holdings LLC, San Francisco, CA (US)

(72) Inventors: Jonathan Langefeld, Lathrop, CA (US); Fnu Pushkar Devanahalli, Bothell, WA (US)

(73) Assignee: GM Cruise Holdings LLC, San Francisco, CA (US)

( * ) Notice: Subject to any disclaimer, the term of this patent is extended or adjusted under 35 U.S.C. 154(b) by 152 days.

(21) Appl. No.: 18/176,307

(22) Filed: Feb. 28, 2023

(65) Prior Publication Data

US 2024/0289112 A1    Aug. 29, 2024

(51) Int. Cl.
  *G06F 8/65* (2018.01)
  *B60W 60/00* (2020.01)
(52) U.S. Cl.
  CPC ............. *G06F 8/65* (2013.01); *B60W 60/001* (2020.02)
(58) Field of Classification Search
  USPC ........................................................ 717/168
  See application file for complete search history.

(56) References Cited

U.S. PATENT DOCUMENTS

| | | | | |
|---|---|---|---|---|
| 11,275,573 | B1* | 3/2022 | Javadekar | G06F 9/455 |
| 2016/0085543 | A1* | 3/2016 | Islam | G06F 9/5077 |
| | | | | 717/171 |
| 2017/0192772 | A1* | 7/2017 | Islam | G06F 11/2041 |
| 2018/0373521 | A1* | 12/2018 | Huang | H04L 67/34 |
| 2020/0379744 | A1* | 12/2020 | Bhupati | H04L 67/61 |
| 2021/0089295 | A1* | 3/2021 | Hart | G06F 9/546 |
| 2022/0050674 | A1* | 2/2022 | Liljeback | G06F 8/60 |
| 2023/0205509 | A1* | 6/2023 | Baral | G06Q 50/40 |
| | | | | 717/172 |
| 2023/0315422 | A1* | 10/2023 | Dai | G06F 11/3409 |
| | | | | 717/168 |
| 2024/0103834 | A1* | 3/2024 | Shemer | G06F 8/60 |
| 2024/0256250 | A1* | 8/2024 | Bokka | G06F 8/65 |

OTHER PUBLICATIONS

"Intro to Deployment Strategies: Blue-Green, Canary, and More"; Harness.io blog page [Full URL included in ref.]; Jan. 15, 2021 (Year: 2021).*

* cited by examiner

*Primary Examiner* — Qing Chen
*Assistant Examiner* — Clint Thatcher

(57) ABSTRACT

Platforms to support and manage an autonomous vehicle (AV) fleet can be implemented on and supported by cluster infrastructure. Cluster infrastructure may include different clusters, such as a cluster for an AV fleet with safety drivers, and a cluster for an AV fleet without safety drivers. Updates to the cluster infrastructure can be made to multiple clusters at once. Such updates may cause an outage that impacts multiple clusters and create a massive vehicle retrieval event for all AV fleets. To mitigate the risk and allow for prioritization of clusters, updates can be rolled out in a staged and ordered manner according to order values associated with different clusters. After applying an update to a cluster at a stage of the roll out, the cluster may be evaluated to confirm the success of the update, before the roll out can be moved to the next stage.

20 Claims, 9 Drawing Sheets

```
502
kind: Deliveries
metadata:
  name: deliveries
  namespace: clusters
status:
  priorities:
    "100":
      "clusters/vendor":
        ready: true
        hotfix: false
      "clusters/roboflow":
        ready: true
        hotfix: false
    "200":
      "clusters/product":
        ready: false
        hotfix: false
    "300":
      "clusters/driverless":
        ready: false
        hotfix: false
  order: [100, 200, 300]
  current: 200
```

```
kind: Deliveries
metadata:
  name: deliveries
  namespace: clusters
status:
  priorities:
    "100":
      "clusters/vendor":
        ready: true
        hotfix: false
      "clusters/roboflow":
        ready: true
        hotfix: false
    "200":
      "clusters/product":
        ready: false
        hotfix: false
    "300":
      "clusters/driverless":
        ready: false
        hotfix: false
  order: [100, 200, 300]
  current: 200
```

```
type ExecutionGate struct {
  Ready  bool `json:"ready"`
  Hotfix bool `json:"hotfix"`
}
```

PROGRESSIVE DELIVERY OF CLUSTER INFRASTRUCTURE UPDATES

BACKGROUND

Technical Field

The present disclosure generally relates to cluster infrastructure and, more specifically, to progressive delivery of cluster infrastructure updates.

INTRODUCTION

Cluster infrastructure can include hardware and software resources deployed to support systems with high availability, scalability, and performance. Systems can be deployed on the cluster infrastructure, and the cluster infrastructure enables the systems to service requests being made to the systems.

Autonomous vehicles (AVs), also known as self-driving cars, and driverless vehicles, may be vehicles that use multiple sensors to sense the environment and move without human input. Technology in AVs may enable vehicles to drive on roadways and to accurately and quickly perceive the vehicle's environment, including obstacles, signs, and traffic lights. AV technology may utilize geographical information and semantic objects (such as parking spots, lane boundaries, intersections, crosswalks, stop signs, and traffic lights) for facilitating vehicles in making driving decisions. The vehicles can be used to pick-up passengers and drive the passengers to selected destinations. The vehicles can also be used to pick-up packages and/or other goods and deliver the packages and/or goods to selected destinations.

BRIEF DESCRIPTION OF THE DRAWINGS

The various advantages and features of the present technology will become apparent by reference to specific implementations illustrated in the appended drawings. A person of ordinary skill in the art will understand that these drawings show only some examples of the present technology and would not limit the scope of the present technology to these examples. Furthermore, the skilled artisan will appreciate the principles of the present technology as described and explained with additional specificity and detail through the use of the accompanying drawings in which:

FIG. 6 illustrates an exemplary definition for a deliveries custom resource, according to some aspects of the disclosed technology;

FIG. 7 illustrates an exemplary data structure encoding whether a cluster has been updated successfully and encoding whether an update is a hotfix for the cluster, according to some aspects of the disclosed technology;

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details that provide a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Overview

Figure 1:
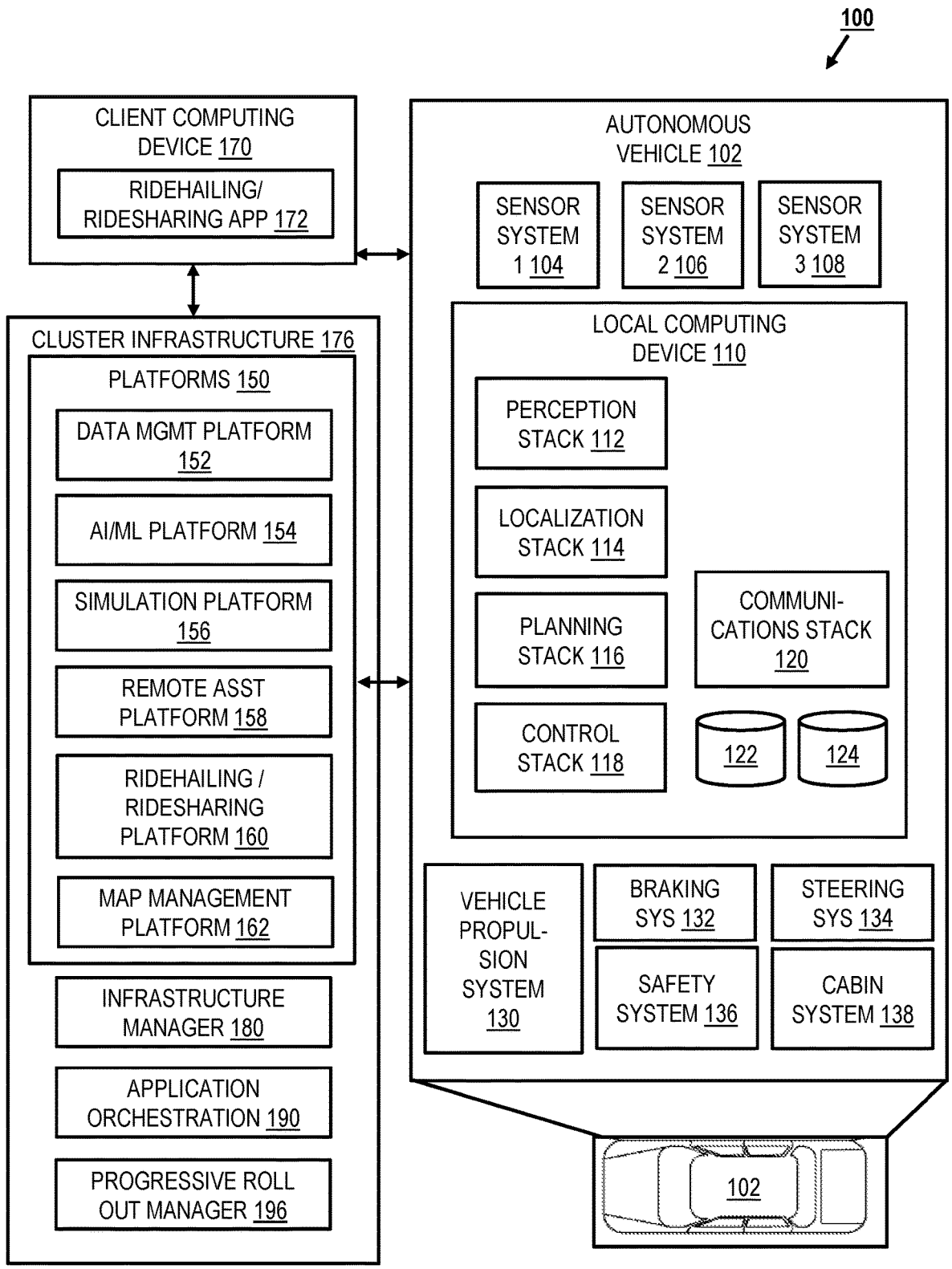
FIG. 1 illustrates an exemplary system environment that may be used to facilitate AV operations, according to some aspects of the disclosed technology.

Platforms to support and manage an autonomous vehicle (AV) fleet can be implemented on and supported by cluster infrastructure. Exemplary platforms are illustrated in FIG. 1.

Cluster infrastructure may include different clusters, such as a cluster for an AV fleet with safety drivers, and a cluster for an AV fleet without safety drivers. Other examples of clusters may include a staging cluster, a development cluster, and a production cluster. Yet further examples may include different clusters for different operational design domains. Cluster operators can be responsible for maintaining and updating the various clusters in cluster infrastructure.

Many scenarios may trigger a cluster infrastructure update to be performed on a plurality of clusters. In some cases, the configuration of resources (e.g., certain configuration settings) in the clusters may be updated. In some cases, the software tools used for managing the cluster infrastructure (e.g., application orchestration, data traffic management, etc.) may be updated to a new version. In some cases, security tools on the cluster infrastructure may be updated to a new version. In some cases, networked locations for certain resources (e.g., secrets, data, and repositories) may change due to data or content being migrated. In some cases, new add-ons (e.g., services) may be deployed and configured onto various clusters when developers change a manifest of a platform or application that is deployed on the clusters.

A cluster operator can trigger a single update to be made to multiple clusters at once in the cluster infrastructure. Such updates may be risky. If the update is faulty, the blast radius of the faulty update can be huge. A faulty update can cause an outage that impacts multiple clusters and create a massive vehicle retrieval event for all AV fleets. Worse yet, a faulty update not only causes an outage with a development cluster, the faulty update takes down a production cluster. While a cluster operator may manually perform a cluster-by-cluster update, managing and monitoring the update process can be labor intensive (a cluster-by-cluster update may span over days or weeks).

To mitigate the risk and allow for prioritization of clusters, updates can be rolled out in a staged and ordered manner according to order values associated with different clusters. Clusters may have corresponding order values, so that clusters can be sorted and grouped based on the order values. In a staged manner, updates are not applied to all clusters at once, but only a subset of clusters at a time (or at each stage). For example, during a stage of the roll out process, updates can be applied to clusters having a given order value or within a given range of order values. The stages may proceed, one stage after another, based on a sorted order of the order values, or a sorted order of ranges/sets of order values. The order values may dictate which clusters may receive an update before other clusters. A stage in the roll out may involve applying an update to clusters having a specific current order value or clusters having an order value within a specific current range of order values. After applying an update to one or more clusters at a stage of the roll out, the one or more clusters may be evaluated to confirm the success of the update, before the roll out can proceed to the next stage.

A progressive roll out manager implemented on cluster infrastructure can carry out and roll out an update to different clusters in a strategic and controlled manner. A data structure, referred to as a custom resource herein, can be created and updated (e.g., regularly reconciled) to track a progress or state of the roll out. The custom resource can provide gating information for whether the roll out can proceed with the next stage of the roll out process. The custom resource can sort clusters by their order values, allowing for the update to be rolled out strategically to clusters in stages. Structured and well-defined checks can be performed before a roll out can proceed to a next stage. The checks may include performance metrics and functional tests. Clusters that received an update may be allowed to bake after the update, e.g., to allow a cluster to have sufficient time to reach a success condition, or to confirm no issues have occurred for a sufficient period of time after the update was applied, before a roll out can proceed to a next stage.

Platforms for an AV Fleet Supported by Cluster Infrastructure

To better understand the varied systems that can be implemented on cluster infrastructure, FIG. 1 illustrates an exemplary system environment that may be used to facilitate AV operations, according to some aspects of the disclosed technology.

One of ordinary skill in the art will understand that, for the AV management system 100 and any system discussed in the present disclosure, there may be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a cluster infrastructure 176, and a client computing device 170. The AV 102, cluster infrastructure 176, and the client computing device 170 may communicate with one another over one or more networks.

AV 102 may navigate about roadways without a human driver based on sensor signals generated by multiple sensor systems 104, 106, and 108. The sensor systems 104-108 may include different types of sensors and may be arranged about the AV 102. For instance, the sensor systems 104-108 may comprise Inertial Measurement Units (IMUs), cameras (e.g., still image cameras, video cameras, etc.), light sensors (e.g., light detection and ranging (LIDAR) systems, ambient light sensors, infrared sensors, etc.), radio detection and ranging (RADAR) systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 may be a camera system, the sensor system 106 may be a LIDAR system, and the sensor system 108 may be a RADAR system. Other embodiments may include any other number and type of sensors.

AV 102 may also include several mechanical systems that may be used to maneuver or operate AV 102. For instance, the mechanical systems may include vehicle propulsion system 130, braking system 132, steering system 134, safety system 136, and cabin system 138, among other systems. Vehicle propulsion system 130 may include an electric motor, an internal combustion engine, or both. The braking system 132 may include an engine brake, a wheel braking system (e.g., a disc braking system that utilizes brake pads), hydraulics, actuators, and/or any other suitable componentry configured to assist in decelerating AV 102. The steering system 134 may include suitable componentry configured to control the direction of movement of the AV 102 during navigation. Safety system 136 may include lights and signal indicators, a parking brake, airbags, and so forth. The cabin system 138 may include cabin temperature control systems, in-cabin entertainment systems, and so forth. In some embodiments, the AV 102 may not include human driver actuators (e.g., steering wheel, handbrake, foot brake pedal, foot accelerator pedal, turn signal lever, window wipers, etc.) for controlling the AV 102. Instead, the cabin system 138 may include one or more client interfaces (e.g., GUIs, Voice User Interfaces (VUIs), etc.) for controlling certain aspects of the mechanical systems 130-138.

AV 102 may additionally include a local computing device 110 that is in communication with the sensor systems 104-108, the mechanical systems 130-138, platforms 150 on the cluster infrastructure 176, and the client computing device 170, among other systems. The local computing device 110 may include one or more processors and memory, including instructions that may be executed by the one or more processors. The instructions may make up one or more software stacks or components responsible for controlling the AV 102; communicating with the cluster infrastructure 176, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a planning stack 116, a control stack 118, a communications stack 120, an HD geospatial database 122, and an AV operational database 124, among other stacks and systems. Collectively, a perception stack 112, a mapping and localization stack 114, a planning stack 116, a control stack 118 of the local computing device 110 may provide functionalities of an AV stack.

Perception stack 112 may enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 122, other components of the AV, and other data sources (e.g., platforms 150 on the cluster infrastructure 176, the client computing device 170, third-party data sources, etc.). The perception stack 112 may detect and classify objects and determine their current and predicted locations, speeds, directions, and the like. In addition, the perception stack 112 may determine the free space around the AV 102 (e.g., to maintain a safe distance from other objects, change lanes, park the AV, etc.). The perception stack 112 may also identify environmental uncertainties, such as where to look for moving objects, flag areas that may be obscured or blocked from view, and so forth.

Mapping and localization stack 114 may determine the AV's position and orientation (pose) using different methods from multiple systems (e.g., GPS, IMUs, cameras, LIDAR, RADAR, ultrasonic sensors, the HD geospatial database 122, etc.). For example, in some embodiments, the AV 102 may compare sensor data captured in real-time by the sensor systems 104-108 to data in the HD geospatial database 122 to determine its precise (e.g., accurate to the order of a few centimeters or less) position and orientation. The AV 102 may focus its search based on sensor data from one or more first sensor systems (e.g., GPS) by matching sensor data from one or more second sensor systems (e.g., LIDAR). If the mapping and localization information from one system is unavailable, the AV 102 may use mapping and localization information from a redundant system and/or from remote data sources.

The planning stack 116 may determine how to maneuver or operate the AV 102 safely and efficiently in its environment. For example, the planning stack 116 may receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, DPVs, etc.), traffic rules and other safety standards or practices for the road, user input, and other relevant data for directing the AV 102 from one point to another. The planning stack 116 may determine multiple sets of one or more mechanical operations that the AV 102 may perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 116 may select from multiple backup plans to carry out. For example, while preparing to change lanes to turn right at an intersection, another vehicle may aggressively cut into the destination lane, making the lane change unsafe. The planning stack 116 could have already determined an alternative plan for such an event, and upon its occurrence, help to direct the AV 102 to go around the block instead of blocking a current lane while waiting for an opening to change lanes.

The control stack 118 may manage the operation of the vehicle propulsion system 130, the braking system 132, the steering system 134, the safety system 136, and the cabin system 138. The control stack 118 may receive sensor signals from the sensor systems 104-108 as well as communicate with other stacks or components of the local computing device 110 or a remote system (e.g., platforms 150 and other components on the cluster infrastructure 176) to effectuate the operation of the AV 102. For example, the control stack 118 may implement the final path or actions from the multiple paths or actions provided by the planning stack 116. The implementation may involve turning the routes and decisions (e.g., a trajectory) from the planning stack 116 into commands for the actuators that control the AV's steering, throttle, brake, and drive unit.

The communication stack 120 may transmit and receive signals between the various stacks and other components of the AV 102 and between the AV 102, platforms 150 on the cluster infrastructure 176, the client computing device 170, and other remote systems. The communication stack 120 may enable the local computing device 110 to exchange information remotely over a network. The communication stack 120 may also facilitate local exchange of information, such as through a wired connection or a local wireless connection.

The HD geospatial database 122 may store HD maps and related data of the streets upon which the AV 102 travels. In some embodiments, the HD maps and related data may comprise multiple layers, such as an areas layer, a lanes and boundaries layer, an intersections layer, a traffic controls layer, and so forth. The areas layer may include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer may include geospatial information of road lanes (e.g., lane or road centerline, lane boundaries, type of lane boundaries, etc.) and related attributes (e.g., direction of travel, speed limit, lane type, etc.). The lanes and boundaries layer may also include 3D attributes related to lanes (e.g., slope, elevation, curvature, etc.). The intersections layer may include geospatial information of intersections (e.g., crosswalks, stop lines, turning lane centerlines, and/or boundaries, etc.) and related attributes (e.g., permissive, protected/permissive, or protected only left-turn lanes; permissive, protected/permissive, or protected only U-turn lanes; permissive or protected only right-turn lanes; etc.). The traffic controls layer may include geospatial information of traffic signal lights, traffic signs, and other road objects and related attributes.

The AV operational database 124 may store raw AV data generated by the sensor systems 104-108 and other components of the AV 102 and/or data received by the AV 102 from remote systems (e.g., platforms 150 on the cluster infrastructure 176, the client computing device 170, etc.). In some embodiments, the raw AV data may include HD LIDAR point cloud data, image or video data, RADAR data, GPS data, and other sensor data that the platforms 150 on cluster infrastructure 176 may use for creating or updating AV geospatial data.

Cluster infrastructure 176 may include hardware resources and software resources. Cluster infrastructure 176 may be housed in one or more data centers. Cluster infrastructure 176 may have a plurality of clusters (or organized as different clusters). Hardware resources can include computing/processing resources, data storage resources, network resources, etc. Examples of computing/processing resources may include machine-learning processors (e.g., machine-learning accelerators or neural processing unit), central processing units (CPUs), graphics processing units (GPUs), quantum computers, etc. Examples of data storage resources may include disk storage devices, memory storage devices, database servers, etc. Network resources may include network appliances (e.g., switches, routers, etc.), network connections, interconnects, etc. Software resources may include firmware for the hardware resources, operating systems for the hardware resources, virtual machines running on the hardware resources, software that manage the hardware resources, etc. Cluster infrastructure 176 may include resources managed by one or more providers.

Cluster infrastructure 176 may be a private cloud (e.g., an enterprise network, a co-location provider network, etc.), a public cloud (e.g., an infrastructure as a service (IaaS) network, a platform as a service (PaaS) network, a software as a service (SaaS) network, or other communication service provider (CSP) network), a hybrid cloud, a multi-cloud, and so forth. Cluster infrastructure 176 can include hardware and software resources remote to the local computing device 110 for managing a fleet of AVs and AV-related services. For example, in addition to managing the AV 102, the cluster infrastructure 176 may support a ridehailing/ridesharing service, a delivery service, a remote/roadside assistance service, street services (e.g., street mapping, street patrol, street cleaning, street metering, parking reservation, etc.), sensor calibration, and the like.

Cluster infrastructure 176 may include platforms 150 deployed on cluster infrastructure 176. Platforms 150 illustrate various platforms that support AV operations or management of fleets of AVs. The cluster infrastructure 176 having these platforms 150 may send and receive various signals to and from the AV 102 and the client computing device 170. These signals may include sensor data captured by the sensor systems 104-108, roadside assistance requests, software updates, ridesharing pick-up and drop-off instructions, and so forth.

In this example, the platforms 150 may include one or more of: a data management platform 152, an Artificial Intelligence/Machine-Learning (AI/ML) platform 154, a simulation platform 156, a remote assistance platform 158, a ridehailing/ridesharing platform 160, and a map management platform 162, among other systems. Many of these systems can be implemented on and supported by cluster infrastructure 176.

Data management platform 152 may be a "big data" system capable of receiving and transmitting data at high speeds (e.g., near real-time or real-time), processing a large variety of data, and storing large volumes of data (e.g., terabytes, petabytes, or more of data). The varieties of data may include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the cluster infrastructure 176 may access data stored by the data management platform 152 to provide their respective services.

The AI/ML platform 154 may provide the systems for training and evaluating machine-learning algorithms for operating the AV 102 (e.g., machine-learning models used in the AV stack), the simulation platform 156, the remote assistance platform 158, the ridehailing/ridesharing platform 160, the map management platform 162, and other platforms and systems. Using the AI/ML platform 154, data scientists may prepare data sets from the data management platform 152; select, design, and train machine-learning models; evaluate, refine, and deploy the models; maintain, monitor, and retrain the models; and so on.

The simulation platform 156 may simulate (or mimic) and/or augment real-world conditions (e.g., roads, lanes, buildings, obstacles, other traffic participants (e.g., other vehicles, cyclists, and pedestrians), trees, lighting conditions, weather conditions, etc.) so that the AV stack of an AV may be tested in a virtual environment that is similar to a real physical world. The simulation platform 156 may create a virtual environment that emulates physics of the real-world and sensors of an AV. Testing and evaluating AVs in simulation platform 156 can be more efficient and allow for creation of specific traffic scenarios that may occur rarely in the real-world. Moreover, the AV stack can even be tested in thousands of scenarios in parallel in simulation. More specifically, the AV stack may be executed in a simulator simulating various traffic scenarios at a time. With simulation platform 156, the AV stack implementing the perception, prediction, planning, and control algorithms can be developed, evaluated, validated, and fine-tuned in a simulation environment. The simulation platform 156 can also be used to evaluate only a portion of the AV stack.

The remote assistance platform 158 may generate and transmit instructions to control the operation of the AV 102. For example, in response to active trigger(s) being detected by the local computing device 110 on the AV 102, the remote assistance platform 158 may respond by creating a remote assistance session with a remote assistance operator to assist the AV 102. The remote assistance platform 158 may, with assistance from the remote assistance operator generate and transmit instructions to the AV 102 to cause the AV 102 to perform a special driving maneuver (e.g., to drive AV 102 in reverse). The remote assistance platform 158 may utilize the remote assistance session to communicate with a customer in the AV 102 via the client computing device 170 to resolve concerns of the customer.

The ridehailing/ridesharing platform 160 (e.g., a web application) may interact with a customer of a ridehailing/ridesharing service via a ridehailing/ridesharing application 172 executing on the client computing device 170. Ridehailing/ridesharing platform 160 may provide delivery services as well. The client computing device 170 may be any type of computing system, including a server, desktop computer, laptop, tablet, smartphone, smart wearable device, gaming system, or other general-purpose computing device for accessing the ridehailing/ridesharing application 172. The client computing device 170 may be a customer's mobile computing device or a computing device integrated with the AV 102 (e.g., the local computing device 110). The ridehailing/ridesharing platform 160 may receive requests to be picked up or dropped off from the ridehailing/ridesharing application 172, and dispatch the AV 102 for the trip. A similar platform can be provided for delivery services.

Map management platform 162 may provide a set of tools for the manipulation and management of geographic and spatial (geospatial) and related attribute data. The data management platform 152 may receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data may be processed, and map management platform 162 may render base representations (e.g., tiles (2D), bounding volumes (3D), etc.) of the AV geospatial data to enable users to view, query, label, edit, and otherwise interact with the data. Map management platform 162 may manage workflows and tasks for operating on the AV geospatial data. Map management platform 162 may control access to the AV geospatial data, including granting or limiting access to the AV geospatial data based on user-based, role-based, group-based, task-based, and other attribute-based access control mechanisms. Map management platform 162 may provide version control for the AV geospatial data, such as to track specific changes that (human or machine) map editors have made to the data and to revert changes when necessary. Map management platform 162 may administer release management of the AV geospatial data, including distributing suitable iterations of the data to different users, computing devices, AVs, and other consumers of HD maps. Map management platform 162 may provide analytics regarding the AV geospatial data and related data, such as to generate insights relating to the throughput and quality of mapping tasks.

Cluster infrastructure 176 may include infrastructure manager 180 (e.g., software resources that manages the hardware resources of the cluster infrastructure 176), and application orchestration 190 (e.g., software that orchestrates deployments and maintenance of systems and services onto the cluster infrastructure 176). Infrastructure manager 180 may include software on top of cluster infrastructure 176 that allows cluster operators to define and organize the underlying resources in cluster infrastructure 176. An infrastructure manager 180 may be provided by a provider of the cluster infrastructure 176 (e.g., native to the cluster infrastructure 176). An infrastructure manager 180 may be provided by third-party developers which are not a part of the provider of the cluster infrastructure 176 (e.g., not necessarily native to the cluster infrastructure 176 but can interface with the cluster infrastructure 176). An infrastructure manager 180 may be referred to Infrastructure-as-code (IaC). IaC may provision resources in cluster infrastructure 176 through machine-readable definition files.

Application orchestration 190 may include software that work with cluster infrastructure 176 and/or infrastructure manager 180 to deploy and maintain platforms, systems, and services (sometimes referred to as applications) running on the cluster infrastructure 176. Application orchestration 190 may allow users of cluster infrastructure 176 to configure, deploy, coordinate, and manage applications on cluster infrastructure 176. Some application orchestration 190 may provide resource usage optimization, achieve certain quality of service parameters, and load balancing of the applications on cluster infrastructure 176. While not required, applications deployed on cluster infrastructure 176 can be containers (or containerized applications). A container means that the code and dependencies are packaged as a unit or image (e.g., having code, runtime, system tools, system libraries and settings) in such a way that the application can be created and run quickly on cluster infrastructure 176 regardless of the underlying cluster infrastructure environment.

Data management platform 152, AI/ML platform 154, simulation platform 156, remote assistance platform 158, ridehailing/ridesharing platform 160, map management platform 162 are some illustrative examples of applications that can be orchestrated by application orchestration 190 so that they can be deployed and implemented on cluster infrastructure 176.

A cluster operator may define and provision resources in a cluster in cluster infrastructure 176 using a suitable infrastructure manager (e.g., infrastructure manager 180 of FIG. 1) through machine-readable definition files. To create a cluster in cluster infrastructure 176, a cluster operator may enumerate requirements (and configuration settings) of the cluster in a machine-readable definition file. Example requirements may include an identification of a cluster infrastructure provider, an identification of a region in which the cluster should be created, a number of instances of a particular kind/type of hardware resource, an identification of a particular kind/type of software resource, etc.

Application orchestration 190 can orchestrate deployment, maintenance, and scaling of applications on the resources in a cluster. A control plane of application orchestration 190 may service requests for application deployment and requests for maintaining applications running on a cluster. In some embodiments, the control plane may include persistent, lightweight, distributed key-value data store to store configuration data of the cluster, an application programming interface, a scheduler to assign unscheduled applications to a specific resource in the cluster, one or more controllers each having a reconciliation loop, and a controller manager that manages the one or more controllers. The control plane may orchestrate applications onto resources in a cluster, which may be organized and managed by the control plane using nodes and optionally node pools.

A cluster may have one or more nodes. A node (also called a worker) may be a resource on which an application (e.g., systems, services, workloads, etc.) can be deployed. A node may be a virtual or physical machine. A node has a corresponding configuration. The configuration may include properties such as a machine type, a resource type, a specific operating system image, a minimum computing platform, amount of allocable data and/or computing resources for the node (also referred to as a shape of a node), a specific network interface, maximum number of applications that can run on the node, etc. The health/status of the node may be managed by a control plane. A node pool may be a group of nodes within a cluster that all have the same configuration. An application or a job/task, e.g., a unit that can be handled by the scheduler in the control plane is described herein as a pod. A pod may include a containerized application. A scheduler may schedule pods to nodes or node pools based on the configurations and health/state of the nodes or node pools.

Cluster operators may spend a great deal of time and resources maintaining the cluster infrastructure 176 and making sure the cluster infrastructure 176 can support platforms such as platforms 150. Configuration settings for hardware and/or software resources on cluster infrastructure 176 may be updated from time to time. Configuration settings for infrastructure manager 180 and/or application orchestration 190 may be updated from time to time. Cluster operators may change infrastructure manager 180 and use a different one offered by a different developer/provider if appropriate. Cluster operators may update the version of the infrastructure manager 180 and application orchestration 190. Manifests of various platforms 150 deployed on cluster infrastructure 176 may change, and cluster operators may need to implement the changes and/or roll out certain add-ons (or services) to different clusters in cluster infrastructure 176.

For many reasons mentioned herein, it is not trivial to update clusters in cluster infrastructure 176. In some cases, an update may be performed to all clusters in cluster infrastructure 176 at once, and the update may have a large blast radius (e.g., causing widespread outages), if the update is faulty. To better implement updates to many clusters, progressive roll out manager 196 may be implemented on cluster infrastructure 176 or provided with cluster infrastructure 176 to manage and monitor updates being performed to clusters of cluster infrastructure 176. Updates to multiple clusters can be progressively rolled out in stages, in the order according to order values of the clusters. The roll out can proceed to a next stage if certain success conditions (or success criteria) are met. Additional details of the progressive roll out manager 196, including its components and functionalities, are described with FIGS. 2-9.

Ordering of Clusters and an Exemplary Progressive Roll Out Manager

Figure 2:
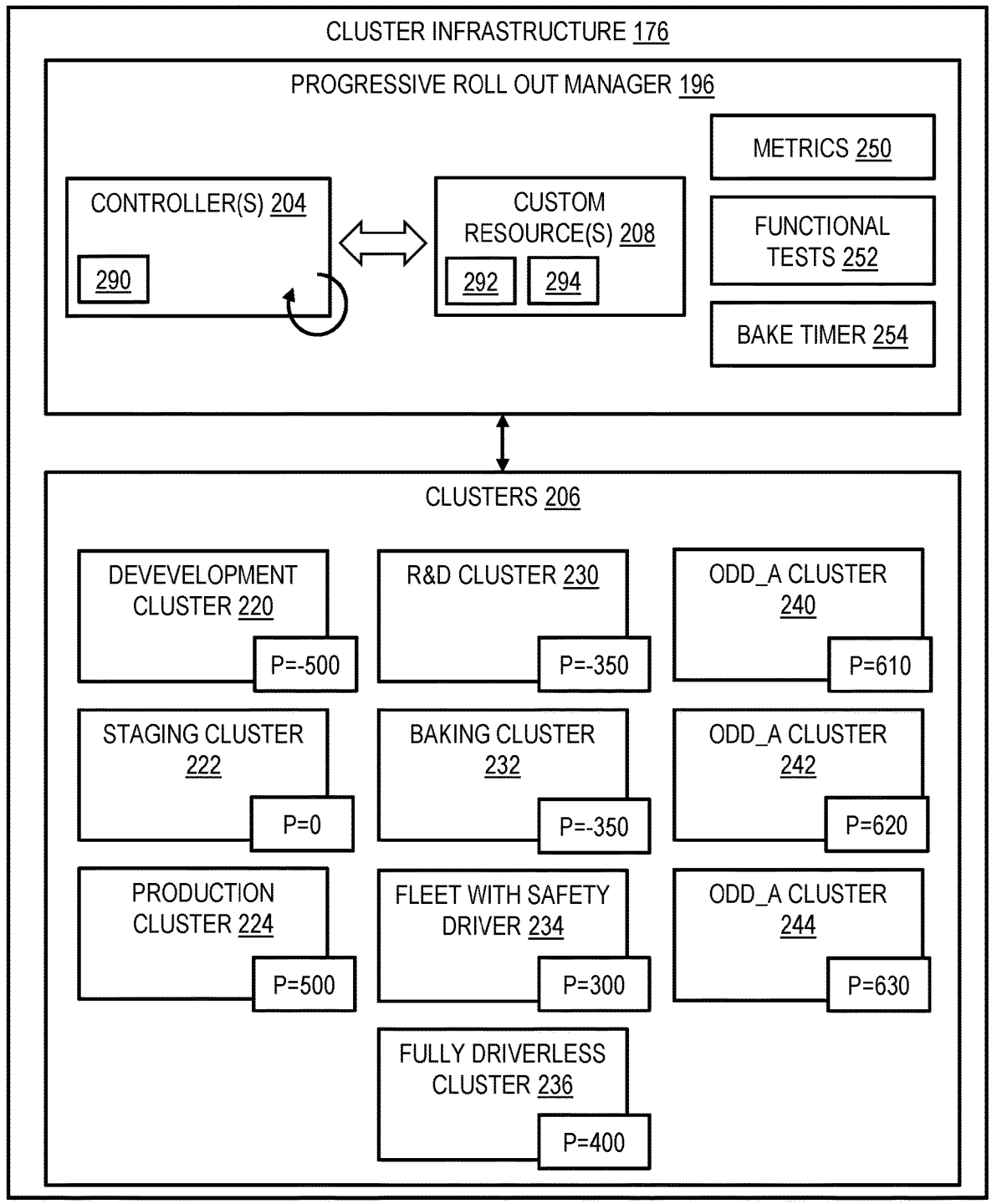
FIG. 2 illustrates exemplary cluster infrastructure having a progressive roll out manager and a plurality of clusters, according to some aspects of the disclosed technology.

FIG. 2 illustrates exemplary cluster infrastructure 176 having a progressive roll out manager 196 and a plurality of clusters 206, according to some aspects of the disclosed technology.

Cluster infrastructure 176 can include a variety of different clusters supporting various platforms such as platforms 150 of FIG. 1 and different fleets of AVs. For example, clusters 206 may include a development cluster 220, a staging cluster 222, and a production cluster 224. Developers may first develop code for a platform within development cluster 220. The developers may build and test versions of code on staging cluster 222. After staging, the developers may deploy tested versions of the code onto production cluster 224, which may then process live network traffic and requests. In another example, clusters 206 may include a research and development cluster 230, a baking cluster 232, a cluster 234 that supports a fleet of AVs with safety drivers, and a cluster 236 that supports a fleet of fully driverless AVs (e.g., without safety drivers). Cluster 234 may be a cluster that has one or more platforms implemented thereon to support a fleet of AVs with drivers. Cluster 236 may be a cluster that has one or more platforms implemented thereon to support a fleet of driverless AVs. Developers working on the platforms that support operation of AVs may first develop code on research and development cluster 230. Developers may let the developed code bake (e.g., run with simulations, run for a period of time) in baking cluster 232. Once it is determined to be ready, developers may deploy the code the cluster 234 that supports a fleet of AVs with safety drivers. When appropriate, developers may deploy the code to the cluster 236 that supports a fleet of fully driverless AVs (e.g., without safety drivers). In yet another example, developers may deploy production-ready code to various clusters that support fleets of vehicles that operate within different operational design domains (ODDs), such as ODD_A cluster 240, ODD_B cluster 242, and ODD_C cluster 244. ODD_A cluster 240 may be a cluster that has one or more platforms implemented thereon to support a first ODD. ODD_B cluster 242 may be a cluster that has one or more platforms implemented thereon to support a second ODD. ODD_C cluster 244 may be a cluster that has one or more platforms implemented thereon to support a third ODD. First, second and third ODDs may be different from each other. ODDs may differ based on, e.g., geography, road conditions, timing and/or environmental conditions, and legal requirements/restrictions/rules in which the AVs operate. Developers may deploy production-ready code to clusters that support different ODDs at the same time, or at different times as appropriate.

In some cases, cluster operators may want to apply a cluster infrastructure update to multiple clusters, such as ones illustrated as part of clusters 206. An exemplary cluster infrastructure update may include a change in a manifest of a platform or application deployed on each one of the clusters. The change in the manifest may necessitate deployment of an add-on or service to multiple clusters. Another exemplary cluster infrastructure update may include a change in a configuration setting of each one of the clusters. Different clusters may have varying levels of sensitivity to outages caused by updates, if outages were to occur. Different clusters may have varying levels of urgency for receiving updates. Different clusters may have varying levels of priority for receiving updates. Based on sensitivity, urgency, and/or priority, it may be beneficial for progressive roll out manager 196 to trigger cluster infrastructure updates to be made in stages, so that updates are not made to all clusters, all at once. The order in which clusters should receive an update can be determined using order values.

As discussed previously, cluster infrastructure 176 may include clusters having different order values. Order values may be used to quantitatively rank or sort clusters, or define an order in which cluster infrastructure updates should be made. Order values, if different, can cause updates to be made to one cluster before another cluster receives the update. The order values can be set in accordance with a predefined ranking/ordering methodology that is understood by the cluster operators setting the order values. One exemplary ranking methodology may rank higher valued numbers higher and cause clusters with higher valued order values to receive an update before clusters with lower valued order values. Another exemplary ranking methodology may rank lower valued numbers, and cause clusters with lower valued order values to receive an update before clusters with higher order values. Order values, if the same, can cause updates to be made to the clusters at the same time. Order values may be numerical values within a range of possible order values. For example, order values may be numerical values within a range of positive numbers. Order values may be numerical values within a range from $-X$ to $+X$, where X is an integer. Order values may be integer values. Exemplary clusters in clusters 206 have exemplary order values, shown as P values. Some clusters may have a mid-point value within a range of order values as the order value by default. Having a range of possible order values allows for flexibility in assigning order values for new clusters and placing new clusters in a suitable position within a sorted/ranked list of clusters based on order values.

The values are shown for illustrative purposes. Some clusters may have different order values. Some clusters may have the same order value. Cluster operators may provide and set these values appropriately. Sorting of these values can be performed in an ascending manner, or equivalently, in a descending manner, as long as the cluster operators setting the order values are aware of which values may cause a cluster infrastructure update to be performed on one cluster before another cluster receives the update.

To implement stages of an update, the progressive roll out manager 196 may be triggered to update clusters in an order based on order values corresponding to the clusters. The progressive roll out manager 196 may maintain a progress or state of a roll out of a cluster infrastructure update being made to multiple clusters. The progressive roll out manager 196 may perform checks to determine whether it is appropriate for the roll out to proceed to a next stage of the roll out (e.g., open or remove a gate to allow the roll out to proceed to the next stage).

In some embodiments, the progressive roll out manager 196 may be implemented on one or more worker nodes of cluster infrastructure 176. The worker nodes may have hardware and software resources provisioned to carry out certain functionalities. Worker nodes can have pods or jobs deployed thereon to carry out different parts of the progressive roll out of the cluster infrastructure update. The resources for worker nodes may include computing and memory resources. The resources for worker nodes may include network resources.

In some embodiments, progressive roll out manager 196 may include controller(s) 204 and custom resource(s) 208. A controller may implement a control loop, and may reconcile one or more custom resources against a real-world state (e.g., by performing a reconciliation function or triggering a reconciliation request). A custom resource may define a desired state of resources (e.g., using a custom resource definition or template). A custom resource can include a data structure that encodes data or state information. The controller can perform a reconcile function to adjust the real-world state to more closely match the desired state. The reconcile function may trigger actions to be performed on cluster resources to adjust the real-world state. A controller can monitor and measure the real-world state of cluster resources, and adjust the cluster resources to match the desired state defined for the custom resource.

As used herein, a controller that has a reconciliation loop is a process implemented on and executed by hardware resources in cluster infrastructure that can routinely, regularly, and/or upon request, execute a reconciliation function to match the real-world state of a custom resource to the desired state defined in the custom resource.

Figure 5:
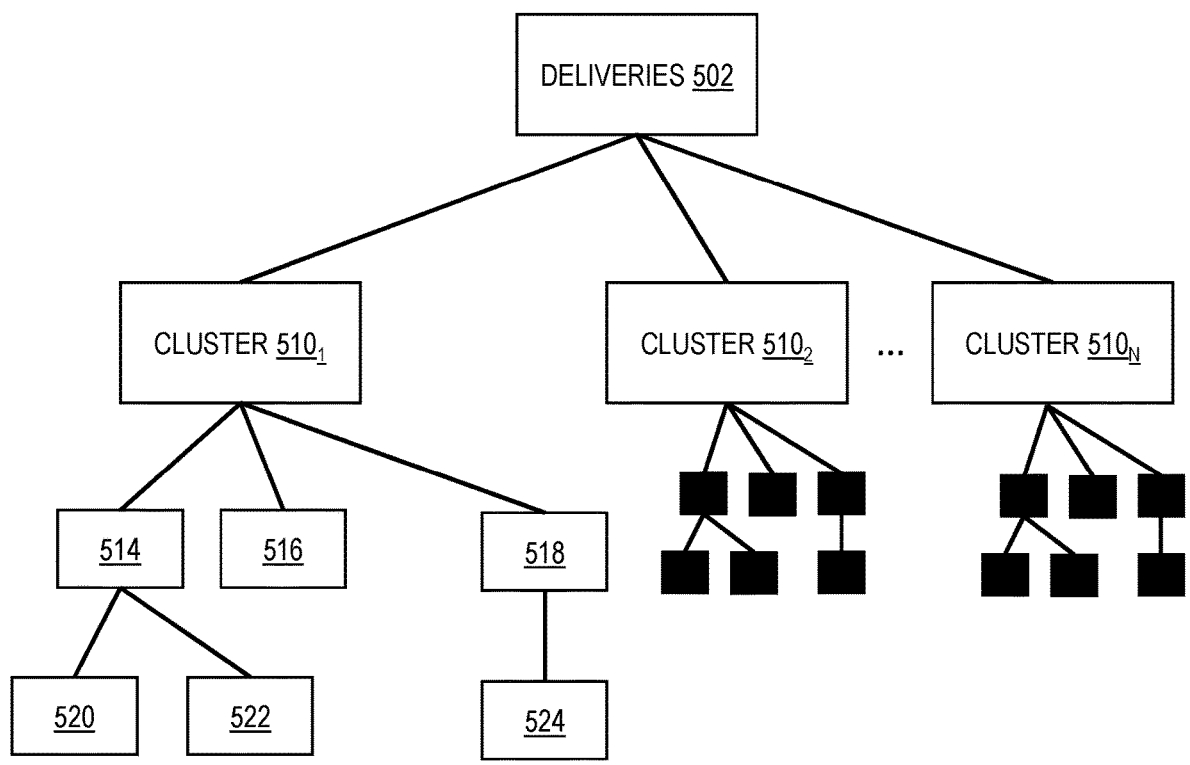
FIG. 5 illustrates a tree hierarchy of custom resources, according to some aspects of the disclosed technology.

For managing resources in clusters, custom resource(s) 208 can be used to define desired states of the cluster resources, and controller(s) 204 can routinely or regularly (e.g., every 5 minutes, every hour, every X minutes, every day, etc.) bring real-world state of cluster resources to the desired states defined in custom resource(s) 208. Some custom resources may define a desired number of instances of a cluster resource. Some custom resources may specify configuration settings of a certain kind of cluster resource. Some custom resources may specify properties of a certain kind of cluster resource. Various resources of a cluster can be specified using custom resource(s) 208. Examples of custom resource(s) 208 for a cluster can include: a cluster custom resource, a compute address custom resource, a compute firewall custom resource, a container cluster custom resource, a container node pools custom resource, a storage bucket custom resource, a modules custom resource, a deployments custom resource etc. Various custom resource(s) 208 may be arranged in a tree hierarchy with dependencies between different custom resources. Some custom resources may be children of another custom resource. A custom resource may be a parent of one or more custom resources. A cluster may have a tree of custom resources. A cluster may have a root custom resource. An exemplary tree structure for custom resources of multiple clusters is illustrated in FIG. 5.

In some embodiments, custom resource(s) 208 may include a plurality of cluster custom resources 294. Different cluster custom resources 294 may correspond to different clusters in cluster infrastructure. A cluster custom resource can represent a root custom resource of a given cluster. A cluster custom resource can have children custom resources representing desired states of cluster resources of the given cluster. A cluster custom resource may have a corresponding order value as a parameter in the cluster custom resource (e.g., an order value parameter).

An update to the cluster infrastructure, e.g., defined in an update specification or desired state definition, may be translated into a change or update to one or more custom resource(s) 208, and the update can be performed on the cluster infrastructure through reconciliation of the custom resource(s). For example, applying an update to a cluster can be performed by updating a cluster custom resource corresponding to the cluster (e.g., updating the desired state definition of the cluster), and triggering a reconciliation request to the cluster custom resource (e.g., causing changes in the real-world state of the cluster to match the desired state definition of the cluster).

In some embodiments, custom resources(s) 208 may include a deliveries custom resource 292. The deliveries custom resource 292 can have a data structure that tracks/maintains state or progress of a progressive roll out of a cluster infrastructure update.

An exemplary deliveries custom resource 292 is illustrated in FIG. 6. The deliveries custom resource 292 can store information about the clusters, such as the order values that correspond to the clusters. The deliveries custom resource 292 can store information about the readiness of a cluster (e.g., a ready property having a "ready" or "not-ready" value), or whether an update made to a cluster meets certain success conditions (or success criteria). The deliveries custom resource 292 can store information about a current order value of the progressive roll out (e.g., identifying clusters that are being updated during a given stage). The deliveries custom resource 292 can store a sorted list of clusters. The deliveries custom resource 292 can store a sorted list of order values.

Controller(s) 204 may include a roll out controller 290. The roll out controller 290 may reconcile a deliveries custom resource 292 that tracks the state of a progressive roll out of the update. The roll out controller 290 may monitor a state of the cluster resources, and can adjust the state of the cluster resources to match the desired state defined in the deliveries custom resource 292. The roll out controller 290 can trigger reconciliation requests of cluster custom resources against an update specification of the update to be performed, when reconciling the real-world state against the desired state defined in the deliveries custom resource 292. The reconciliation requests may be triggered in accordance with order values corresponding to the clusters within the cluster infrastructure. In other words, the reconciliation requests may be triggered in stages to different clusters having different order values, and the order may be dictated by the order values that correspond to the clusters (and the predefined/predetermined ranking or ordering methodology). The roll out controller 290 can query the deliveries custom resource 292 to determine which cluster(s) should be updated during the roll out process. The deliveries custom resource 292 may return information to the roll out controller 290 on whether an operation is needed or if reconciliation requests should be sent to a next set of cluster(s). Performing the reconciliation requests can cause the clusters to be updated to a desired state.

A given cluster custom resource in the cluster custom resources 294 may be a root custom resource of a given cluster. A reconciliation request to the cluster custom resource may cause further reconciliation of the children custom resources of the root custom resource.

The roll out controller 290 may update the deliveries custom resource 292 in response to successful completion of the reconciliation requests. The roll out controller 290 may monitor for the successful completion of the reconciliation requests, and update the state information stored in the deliveries custom resource 292 accordingly. The roll out controller 290 may update readiness information (e.g., a ready property) based on whether the reconciliation requests are considered successful or if the update to a cluster meets certain success condition(s) or success criteria.

Controller(s) 204 may include further controllers to receive the reconciliation requests from the roll out controller to reconcile the (individual) cluster custom resources 294. The further controllers may reconcile the cluster custom resources 294 corresponding to the clusters. The further controllers may perform the reconciliation requests, e.g., to update the clusters, or change the real-world state of the clusters to match a desired state of the clusters.

The roll out controller 290 may trigger one or more pods to evaluate whether the reconciliation requests are completed successfully. For instance, progressive roll out manager 196 may include one or more pods to perform checks to see if an update to a cluster meets certain success condition(s). Success conditions or success criteria may include one or more of: meeting one or more performance metrics, passing one or more functional tests, meeting one or more bake time requirements, etc.

One exemplary pod is a metrics pod 250, which can evaluate logs of a cluster on which an update has been performed against one or more performance metrics. The performance metrics may measure the health of endpoints of a cluster, and assess whether the cluster is sufficiently healthy and operational. The metrics pod 250 may review logs that include events of a cluster or interactions with the cluster.

Another exemplary pod is a functional tests pod 252. The functional tests pod 252 may perform functional tests of a cluster on which an update has been performed. Functional tests may include whether metrics/logs are available. Functional tests may include whether security mechanisms are operational. Functional tests may include checking whether a cluster is behaving or acting as expected. Functional tests may include health checks on endpoints of the cluster. Functional tests may include unit tests. Functional tests may include integration tests. The functional tests to be run may depend on the update being performed on the cluster. The functional tests may include a set of default tests to be performed on a cluster. The one or more pods can report results to the roll out controller 290, or a suitable controller that is reconciling a custom resource. The roll out controller 290 may update the deliveries custom resource 292 accordingly. When an update on a cluster is considered successful by the one or more pods, the cluster custom resource may be considered reconciled and its readiness or state may be updated in the deliveries custom resource 292.

Another exemplary pod is a bake timer pod 254. Functionality of bake timer pod 254 may be included with other pods for checking whether a cluster that just received an update meets success conditions/criteria. Depending on the metric/test, success of an update may depend on a timing component referred to herein as bake time. In some cases, it takes a certain period of time for an update to have an effect on the cluster, or it takes a certain period of time for the cluster to mature and be able to meet a metric or pass a test. Such a cluster may be allowed to bake (e.g., using bake timer pod 254) before the metric or test is evaluated. In some cases, a cluster may fail suddenly after a period time has lapsed (e.g., it takes a while for a problem in the cluster to surface and cause an issue in the cluster). Such a cluster may be checked (regularly) throughout a bake time (e.g., using bake timer pod 254) to ensure that the cluster has not yet failed even after a period of time has lapsed since the update was applied.

Progressive roll out manager 196 may be implemented as a part of application orchestration 190, or apply similar design patterns as application orchestration 190.

Figure 3:
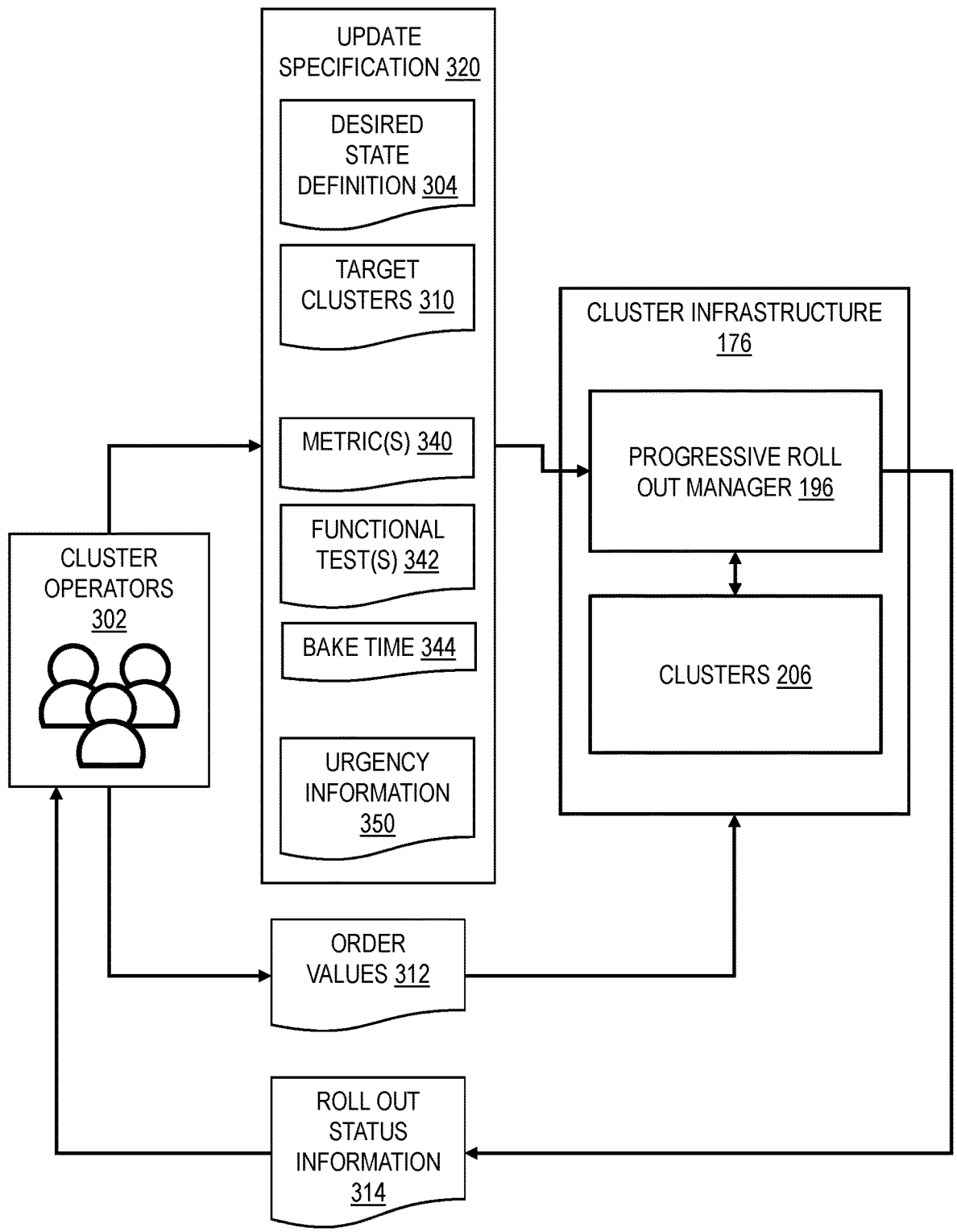
FIG. 3 illustrates exemplary interactions between cluster operators and cluster infrastructure, according to some aspects of the disclosed technology.

FIG. 3 illustrates exemplary interactions between cluster operators and cluster infrastructure, according to some aspects of the disclosed technology. The progressive roll out manager 196 can offer flexibility and configurability for cluster operators 302 to specify an update to be rolled out to target clusters.

A cluster operator 302 may determine/define an update specification 320 for a cluster infrastructure update to be rolled out to clusters. The cluster operator 302 may create a deliveries custom resource (or cause a deliveries custom resource to be created), e.g., based on the update specification 320. An exemplary deliveries custom resource is shown as deliveries custom resource 292 in FIG. 2, and an exemplary definition for the deliveries custom resource is illustrated in FIG. 6. In some embodiments, the progressive roll out manager 196 may receive the definition of the deliveries custom resource (e.g., as desired state definition 304), and can be triggered to reconcile/update the deliveries custom resource. In some cases, the progressive roll out manager 196 may receive the update specification 320 (e.g., including desired state definition 304) and generates the deliveries custom resource based on the update specification 320. The progressive roll out manager 196, e.g., a roll out controller 290 of FIG. 2, may update/reconcile (or be triggered to update/reconcile) this deliveries custom resource to track progress of a progressive roll out of the update and enforce an ordered or staged roll out of the update. The progressive roll out manager 196 (e.g., a roll out controller 290 of FIG. 2) may repeatedly (e.g., at least two times) reconcile the deliveries custom resource against a real-world state of the clusters. Reconciliation may occur as needed or as triggered as the real-world state of the cluster infrastructure changes. Reconciliation may occur every 5 minutes, or at other predetermined cadences (e.g., every X minutes, every hour, every day, etc.). The progressive roll out manager 196 (e.g., one or more other controllers) may reconcile further custom resources corresponding to the clusters against the desired state definition 304, in an order that respects order values of the clusters.

The update specification 320 may include a desired state definition 304 of the cluster infrastructure update. The desired state definition 304 may specify the change being made to cluster infrastructure. The desired state definition 304 may include a custom resource definition for a cluster resource being updated. Cluster operators 302 and/or progressive roll out manager 196 may cause a custom resource to be updated according to the desired state definition 304 so that a controller may change the cluster real-word state (e.g., make a cluster infrastructure update) to match the desired state definition 304 (e.g., as part of reconciling the custom resource).

In some embodiments, the update specification 320 may specify target clusters 310. The update specification 320 may include identification of target clusters to apply the update. The target clusters may be identified by the names of the target clusters. In some cases, update specification 320 may include which clusters to skip or not apply the update.

In some embodiments, the update specification 320 may include priority or urgency information 350 corresponding to the update. The update specification 320 may include a flag to indicate whether the update is a hotfix, meaning that the update should be rolled out to all clusters at once, or with a relatively short bake time.

The update specification 320 may include an ordered list of clusters, or definition of the stages of the roll out. The update specification 320 may specify the order in which clusters are to receive the update.

In some embodiments, the update specification 320 may include order values 312 for the target clusters. In some cases, the order values 312 can be provided by cluster operators 302 (separate from update specification 320). Cluster operators 302 may provide the order values 312 to be assigned to the clusters.

In some embodiments, progressive roll out manager 196 may provide, to cluster operators 302, roll out status information 314 of the progressive roll out of the update using the deliveries custom resource. The progressive roll out manager 196 may allow cluster operators 302 to query the deliveries custom resource. The progressive roll out manager 196 may query the deliveries custom resource. The progressive roll out manager 196 may extract roll out status information 314 from the deliveries custom resource and provide the roll out status information 314 to cluster operators 302. If, for some reason, a stage of the progressive roll out of the cluster infrastructure update fails and cannot move to the next stage, the progressive roll out manager 196 may provide roll out status information 314 to inform cluster operators 302 of the failure.

The progressive roll out manager 196 may offer flexibility and configurability for cluster operators 302 to specify the manner (or parameters) of the roll out, such as the success condition(s) or success criteria for moving to a next stage of the roll out. Examples of the parameters of the roll out include: one or more performance metrics 340, one or more functional tests 342, and bake time 344. The parameters may be enforced by progressive roll out manager 196 (e.g., metrics pod 250, functional tests pod 252, and bake timer pod 254 of FIG. 2). In some cases, the progressive roll out manager 196 may be configured to implement a default set of success condition(s) or success criteria. In some embodiments, cluster operators 302 may provide one or more success criteria for the progressive roll out of the update to progress to one or more clusters having a next order value. The progressive roll out manager 196 may receive the success criteria. Progressive roll out manager 196 may receive, from cluster operators 302, a bake time 344 for the progressive roll out of the update to progress to one or more clusters having a next order value. Progressive roll out manager 196 may receive from cluster operators 302 one or more performance metrics 340 to be met for the progressive roll out of the update to progress to one or more clusters having a next order value. Progressive roll out manager 196 may receive from cluster operators 302 one or more functional tests 342 to be performed for the progressive roll out of the update to progress to one or more clusters having a next order value.

Exemplary Method to Progressively Roll Out an Update to Clusters

Figure 4:
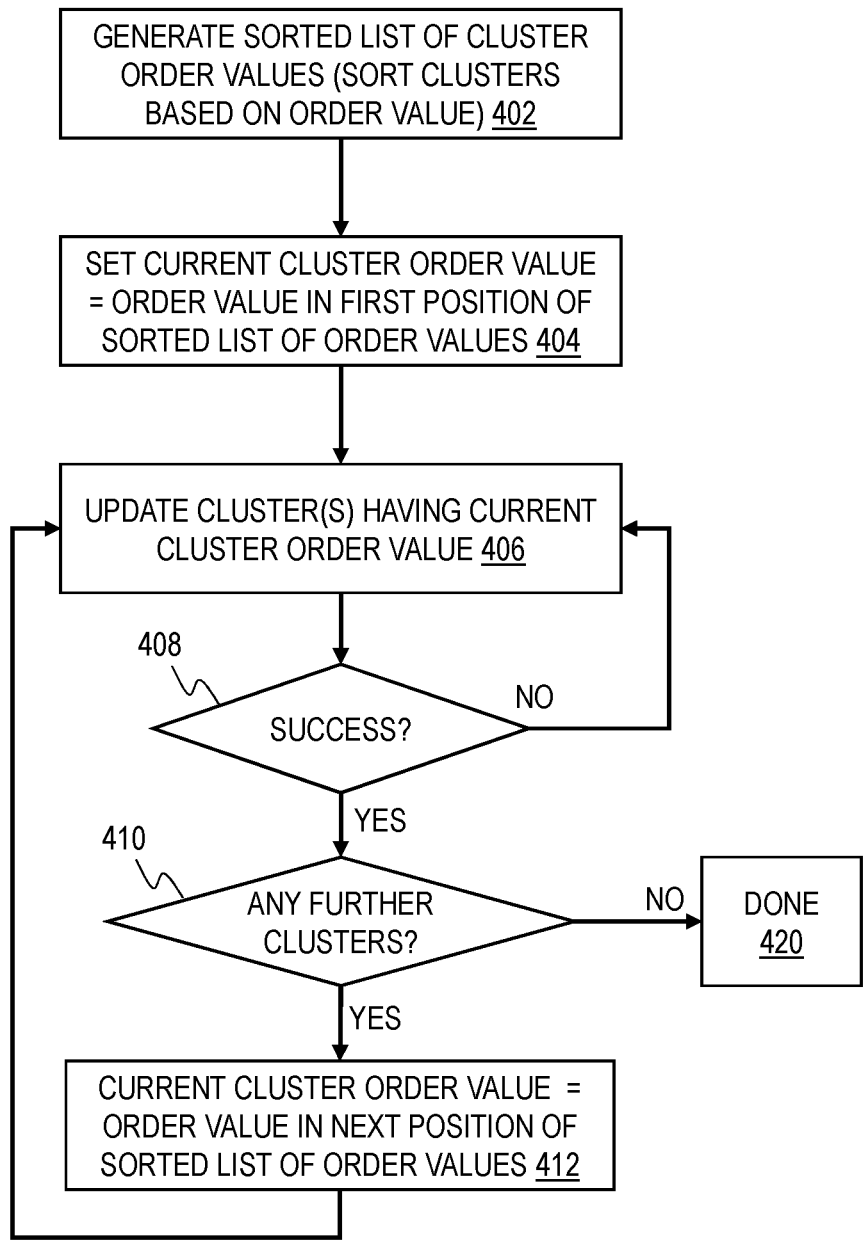
FIG. 4 is a flow diagram illustrating a method to progressively roll out an update to a plurality of clusters, according to some aspects of the disclosed technology.

FIG. 4 is a flow diagram illustrating a method to progressively roll out an update to a plurality of clusters, according to some aspects of the disclosed technology. The method represents one example of executing stages of a progressive roll out of a cluster infrastructure update, by a progressive roll out manager. The execution follows or respects order values corresponding to the clusters. It is envisioned that various sorting techniques may be applied to clusters having different order values. The progressive roll out manager may be configured to check at each stage whether the roll out process may progress to a next stage.

In 402, a sorted list of order values assigned to clusters may be generated. Sorting may put the order values in a ranked order (e.g., ascending or descending order). The sorted list of order values may be set in a deliveries custom resource. In 404, a current cluster order value may be set to an order value in a first position of the sorted list of order values. The current cluster order value may be set in the deliveries custom resource. In 406, an update to one or more clusters having the current cluster order value may be performed. The deliveries custom resource may be queried to determine which clusters have the current cluster order value. In 408, progressive roll out manager may determine whether the update to the one or more clusters having the current cluster order value was successful. If no at 408, the method may return to 406 (e.g., wait until the update is determined to be successful). If yes at 408, the method may proceed to 410, to determine if there are any further order values in the sorted list of order values beyond the current order value. If no at 410, the method is done in 420 (e.g., the update has been completed for the clusters in a staged and ordered manner is complete). If yes at 410, in response to determining the update to the one or more clusters having the current cluster order value was successful, current cluster order value may be set to a further order value in a second position of the sorted list of order values (a next order value in the sorted list of order values). After 412, 406, 408, 410 may be repeated, e.g., until there are no further order values in the sorted list of order values and the method is done at 420.

In some embodiments, the current order value may be a range of values within a full range of order values (as opposed to a single value within the full range of order values), or a subset of values (e.g., a window of values) within the sorted list of order values. Stages of the progressive roll out may be performed to sets/groups of clusters having different ranges of order values. The different ranges of order values can be sorted or ordered to respect the order values. One stage of the roll out may be applied to clusters having a first range of order values. A further stage of the roll out may be applied to clusters having a second range of order values that is in a next position of a sorted list of ranges of order values. A roll out may take too long if stages increments the current order value too slowly, and incrementing the current order value through sets/groups/batches may speed up the progressive roll out process.

In 406, the progressive roll out manager may trigger an update to be performed on one or more clusters having the current cluster order value. An update to be performed for a given cluster may in turn trigger an update to be performed on an entire tree of custom resources of the given cluster. An exemplary tree is illustrated in FIG. 5. For a given cluster of the one or more clusters having the current cluster order value, the progressive roll out manager may determine a tree of custom resources for the given cluster. The progressive roll out manager may reconcile individual custom resources in the tree to match respective desired states. The progressive roll out manager may traverse through the tree, e.g., with breadth first search, or depth first search.

In 408, determining if the update to the one or more clusters having the current cluster order value was successful can include evaluating one or more success criteria. In some embodiments, the progressive roll out manager may determine that the update to the one or more clusters having the current cluster order value was successful in response to logs of the one or more clusters meeting one or more performance metrics. In some embodiments, the progressive roll out manager may determine that the update to the one or more clusters having the current cluster order value was successful in response to the one or more clusters passing one or more functional tests.

In 408, determining if the update to the one or more clusters having the current cluster order value was successful involves using a bake timer. The bake time may be user configurable, or configurable by a cluster operator. In some embodiments, the progressive roll out manager may allow a bake time to lapse after the update was performed. The progressive roll out manager may, in response to the expiration of the bake time (e.g., the bake time has lapsed), evaluate the one or more clusters having the current cluster order value against one or more success criteria. In some embodiments, the progressive roll out manager may evaluate, during a bake time, the one or more clusters having the current cluster order value against one or more success criteria. The progressive roll out manager may, in response to the expiration of the bake time (e.g., bake time has lapsed) and repeated successful evaluations during the bake time (and optionally after expiration) of the bake time, determine that the update to the one or more clusters having the current cluster order was successful.

In some embodiments, in response to determining that the update to the one or more clusters having the current cluster order value was successful, the progressive roll out manager may set a ready property of the one or more clusters having the current cluster order value to a ready value. The ready property for various clusters may be in a deliveries custom resource, such as one illustrated in FIG. 7.

Exemplary Tree Hierarchy of Custom Resources

FIG. 5 illustrates a tree hierarchy of custom resources, according to some aspects of the disclosed technology. Controllers reconciling the custom resources may follow a similar hierarchy or dependencies. A top level custom resource of the tree shown in FIG. 5 may be the deliveries custom resource 502. An example of the deliveries custom resource 502 is shown in FIG. 6. The deliveries custom resource 502 may include pointers to or information regarding children custom resources. The children custom resources of the deliveries custom resource 502 may include cluster custom resources that correspond to target clusters for receiving an update in a progressive roll out. N number of cluster custom resources 5101-N corresponding to N clusters are shown. Examples of cluster custom resources corresponding to different target clusters are shown as cluster custom resource 5101, cluster custom resource 5102, . . . cluster custom resource 510N. The cluster custom resources 5101-N may have corresponding order values (e.g., set as an order value property of a given cluster custom resource) as a property of the cluster custom resources.

The deliveries custom resource 502 may include a map of the clusters grouped by order values corresponding to the clusters. The deliveries custom resource 502 may include an ordered list of the order values of the map of clusters.

Each cluster custom resources 5101-N may serve as the root custom resource of a specific cluster. The specific cluster may have a tree of custom resources. The custom resources may represent a desired state/configuration of resources in the specific cluster. For example, cluster custom resource 5101 may have children custom resources 514, 516, and 518. Custom resource 514 may have children custom resources 520 and 522. Custom resource 518 may have a child custom resource 524.

When a reconciliation request is triggered for a specific cluster custom resource, e.g., cluster custom resource 5101, reconciliation requests are further triggered for the entire tree of custom resources that depend on the specific cluster custom resource.

Exemplary Custom Resource for Tracking Progress of a Progressive Roll Out

FIG. 6 illustrates an exemplary definition for a deliveries custom resource 502, according to some aspects of the disclosed technology. The deliveries custom resource 502 can include a data structure which maintains/keeps order values of target clusters and a state/progress of a progressive roll out of a cluster infrastructure update. A cluster operator may create the deliveries custom resource 502. A roll out operator may reconcile the deliveries custom resource 502. The deliveries custom resource 502 may have information which can help to enforce the order/staging of the progressive roll out. In the example shown, the deliveries custom resource 502 may have metadata including a name of the custom resource and a namespace (or scope) of the custom resource. The deliveries custom resource 502 may have visibility and ability to reconcile custom resources for the clusters, as indicated by the namespace, "clusters".

The deliveries custom resource 502 may include status information of a progressive roll out of a cluster infrastructure update. Status information can include various information or properties.

In some embodiments, status information may include priorities information:

```
priorities:
  "100":
    "clusters/vendor":
      ready: true
      hotfix: false
    "clusters/roboflow":
      ready: true
      hotfix: false
  "200":
    "clusters/product":
      ready: false
      hotfix: false
  "300":
    "clusters/driverless":
      ready: false
      hotfix: false
```

The priorities information may include a map of the clusters grouped by order values corresponding to the clusters. As shown, the map includes three groups of order values (e.g., 100, 200, and 300), and within each group, the cluster(s), e.g., names of the cluster custom resource(s) corresponding to the cluster(s), having the specific order value are listed or identified. For order value 100, "clusters/vendor" and "clusters/roboflow" are cluster custom resources listed/identified as part of the group. For order value 200, "clusters/product" is a cluster custom resource listed/identified as part of the group. For order value 300, "clusters/driverless" is a cluster custom resource listed/identified as part of the group. A key of an outer map of the map may be the order values. The key of an inner map of the map may be unique names (e.g., unique identifier, namespaced name) for various cluster custom resources having that order value. A value of the inner map may have a data structure storing gating information that may indicate to a controller whether an update to a cluster was successful (e.g., whether a cluster custom resource is fully reconciled, or readiness of the cluster after an update was performed). Each cluster listed in the group may have one or more respective properties (as values of the inner nap of the map) indicating whether reconciliation requests should be triggered for the cluster at a given point in time. An exemplary data structure for the properties is illustrated in FIG. 7. The one or more respective properties in the map may be updated against the real-world state of the cluster custom resource, e.g., when a reconciliation request is targeted for the deliveries custom resource 502. A roll out controller may be responsible for reconciling the deliveries custom resource 502.

The status information may include order information:

order: [100, 200, 300]

The order information may include an ordered list of order values of the map of clusters. The ordered list of order values may be beneficial since the keys of the outer map of the map may not be ordered necessarily. In the example shown, the ordered list includes 100, 200, and 300.

The status information may include current information:

current: 200

The current information may include a current order value, or a current order value range. In some cases, the current information may include suitable information that indicates a current order (e.g., an index within the ordered list of order values may be suitable). If the progressive roll out of the update is reconciling cluster custom resources having a certain order value at a certain point in time, the current order value may be set based on the certain order value. In the example shown, the roll out may be reconciling "clusters/product" having an order value of 200. The current order value may be set using the order value of 200.

FIG. 7 illustrates an exemplary data structure (illustrated as definition 702) that can encode whether a cluster has been updated successfully and encode whether an update is a hotfix for the cluster, according to some aspects of the disclosed technology. The data structure, "ExecutionGate", may include one or more boolean flags. The boolean flags represent state information about a cluster custom resource (e.g., a cluster).

A first boolean flag may be the "ready" flag. The ready flag being true may indicate that a specific cluster is fully reconciled (e.g., update was successful), and the next cluster(s) having the next position in the ordered list of order values can start reconciliation. The ready flag being false may indicate that the specific cluster is not yet fully reconciled (e.g., update has not yet been applied successfully). In the example shown, the roll out may have already reconciled the cluster custom resources having order value 100, and the ready flag may be set to true. The ready flag may be reconciled against a real-world state of the cluster, and be set to true when a reconciliation of the cluster custom resource was successful.

When a deliveries custom resource is queried, a set of clusters having the current order value as the order value that do not yet have the ready flag set as true may be returned as a response to the query. The response may indicate that the clusters having the current order value which are not yet ready have not been updated successfully.

A second boolean flag may be the "hotfix" flag. The hotfix flag being true may indicate that this rollout has to be rolled out as a hotfix (or the cluster is configured to always receive updates without waiting for other clusters to complete the update first). A hotfix flag being true for a cluster may mean that the cluster does not need to wait for a cluster of a lesser order (e.g., having a lower order value, or earlier position in the ordered list of order values) before the cluster can be reconciled, but rather, the cluster custom resource may start reconciliation right away. In some cases, if the hotfix flag is true, all clusters having the hotfix flag set as true may reconcile at the same time. The hotfix flag can be used as a break glass scenario, where an update may need to be rolled out quickly to many clusters that cannot wait. A hotfix flag being false for a cluster may mean that the cluster may wait for a cluster of lesser order (e.g., having a lower order value earlier position in the ordered list of order values) before the cluster can be reconciled (e.g., allowing a staged and ordered roll out to occur).

The data structure illustrated in FIG. 7 may allow the progressive roll out manager, e.g., a roll out controller, to query the deliveries custom resource and determine which clusters are to be updated in the progressive roll out. The progressive roll out manager may trigger reconciliation requests for the clusters accordingly to continue on to a next stage of the update.

Further Exemplary Methods to Progressively Roll Out an Update to Clusters

Figure 8:
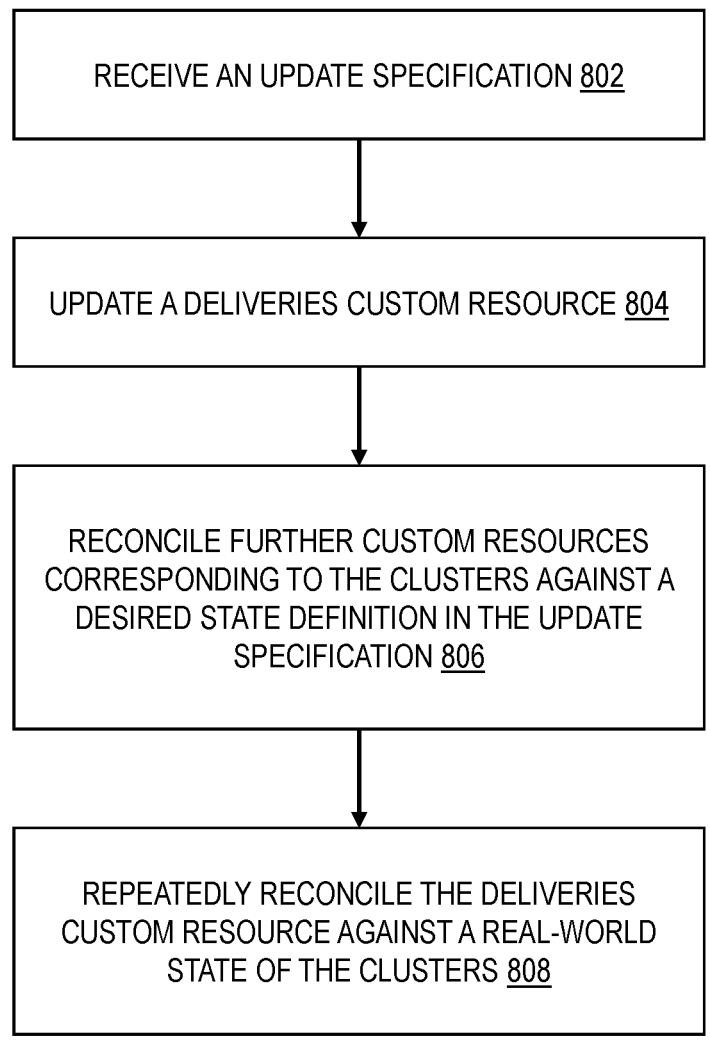
FIG. 8 is a flow diagram illustrating another method to progressively roll out an update to a plurality of clusters, according to some aspects of the disclosed technology.

FIG. 8 is a flow diagram illustrating another method to progressively roll out an update to a plurality of clusters, according to some aspects of the disclosed technology. The method represents one example of executing stages of a progressive roll out of a cluster infrastructure update, by a progressive roll out manager. The execution follows or respects order values corresponding to the clusters. It is envisioned that various sorting techniques may be applied to clusters having different order values. The progressive roll out manager may be configured to check at each stage whether the roll out process may progress to a next stage.

In 802, an update specification may be received (e.g., from a cluster operator looking to update cluster infrastructure). The update specification may include a desired state definition of the update. The update specification may include a definition for a deliveries custom resource. In 804, the progressive roll out manager may update a deliveries custom resource to track progress of a progressive roll out of the update. In 806, the progressive roll out manager may reconcile further custom resources corresponding to the clusters against the desired state definition, in an order that respects order values of the clusters. The progressive roll out manager may reconcile further cluster custom resources corresponding to the target clusters to be updated in an order of the order values of target clusters. In 808, the progressive roll out manager (e.g., using a top level controller) may repeatedly reconcile the deliveries custom resource against a real-world state of the clusters. Repeatedly reconciling the deliveries custom resource may be performed by a roll out controller having a reconciliation loop (e.g., causing the roll out controller to perform a reconciliation function multiple times to reconcile the real-world state against a desired state of the deliveries custom resource).

Figure 9:
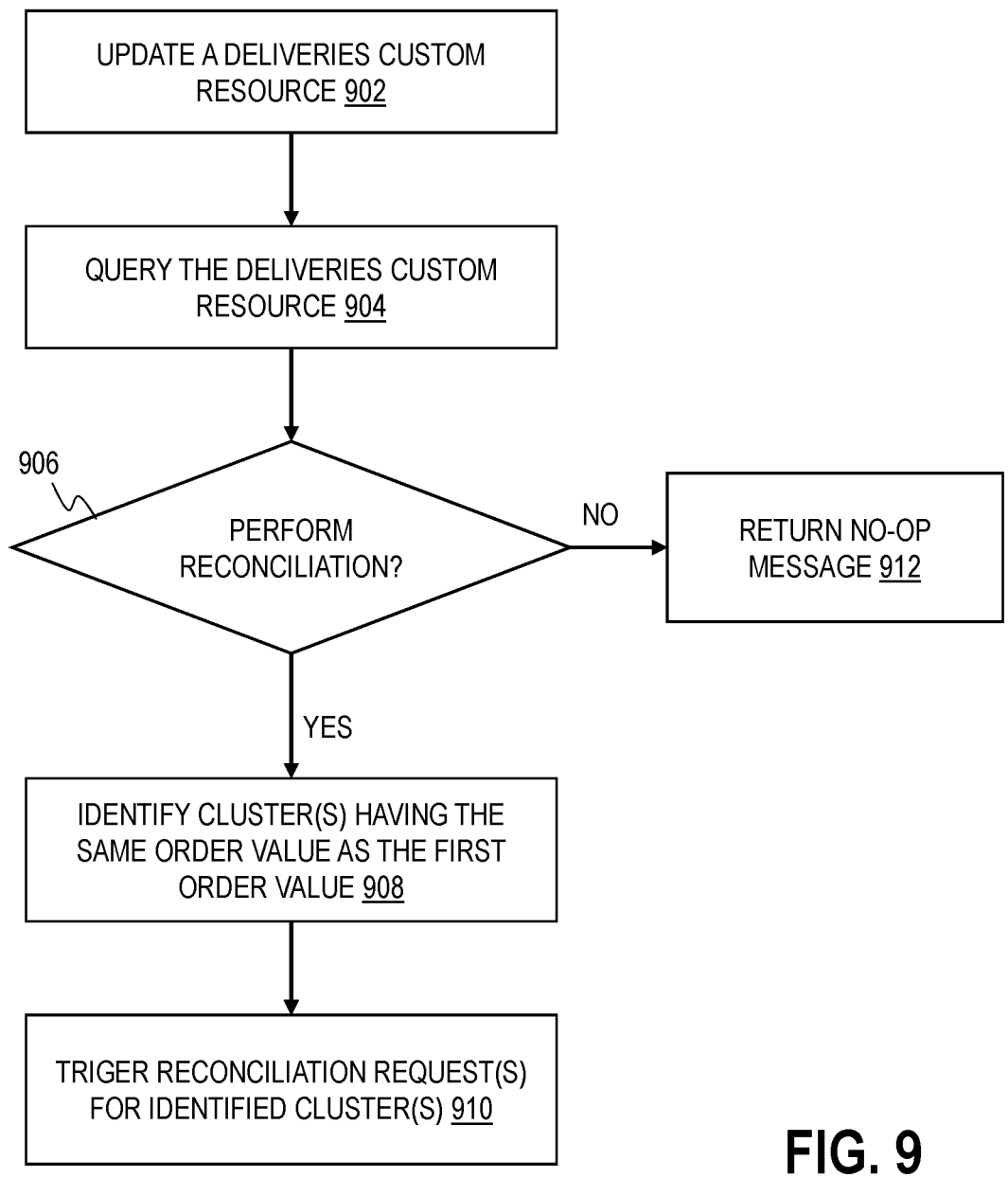
FIG. 9 is a flow diagram illustrating yet another method to progressively roll out an update to a plurality of clusters, according to some aspects of the disclosed technology.

FIG. 9 is a flow diagram illustrating yet another method to progressively roll out an update to a plurality of clusters, according to some aspects of the disclosed technology. The method represents one example of executing stages of a progressive roll out of a cluster infrastructure update, by a progressive roll out manager. The execution follows or respects order values corresponding to the clusters. It is envisioned that various sorting techniques may be applied to clusters having different order values. The progressive roll out manager may be configured to check at each stage whether the roll out process may progress to a next stage.

In 902, a deliveries custom resource may be updated to track progress of a progressive roll out of the update. In some cases, a cluster operator may cause a deliveries custom resource to be created, e.g., based on an update specification. A progressive roll out manager may update reconcile the deliveries custom resource. The deliveries custom resource can be defined by the following: a map of the clusters grouped by order values corresponding to the clusters, an ordered list of the order values of the list of clusters; and a current order value. An exemplary deliveries custom resource is shown in FIG. 7. In 904, the progressive roll out manager may query the deliveries custom resource to evaluate if a reconciliation request of a first cluster to against the desired state definition should be performed, wherein the first cluster has a first order value. In 906, whether the reconciliation request should be performed may be determined based on the status of the progressive roll out (e.g., information in the deliveries custom resource). If no in 906, a no-operation message may be returned in response to determining that the reconciliation request should not be performed in 912. If yes in 906, one or more clusters having the same order value as first order value may be identified based on the deliveries custom resource in 908. In 910, reconciliation request(s) may be triggered for the one or more identified clusters.

In 906, determining whether the reconciliation request should be performed or not may include determining that the reconciliation request should be performed if the first order value matches the current order value of the deliveries custom resource, and determining that the reconciliation request should not be performed if the first order value does not match the current order value of the deliveries custom resource.

The progressive roll out manager may, in response to determining that the reconciliation request of the first cluster was successful, setting a ready property of the first cluster in the deliveries custom resource having the current cluster order value to a ready value.

Exemplary Processor-Based System

Figure 10:
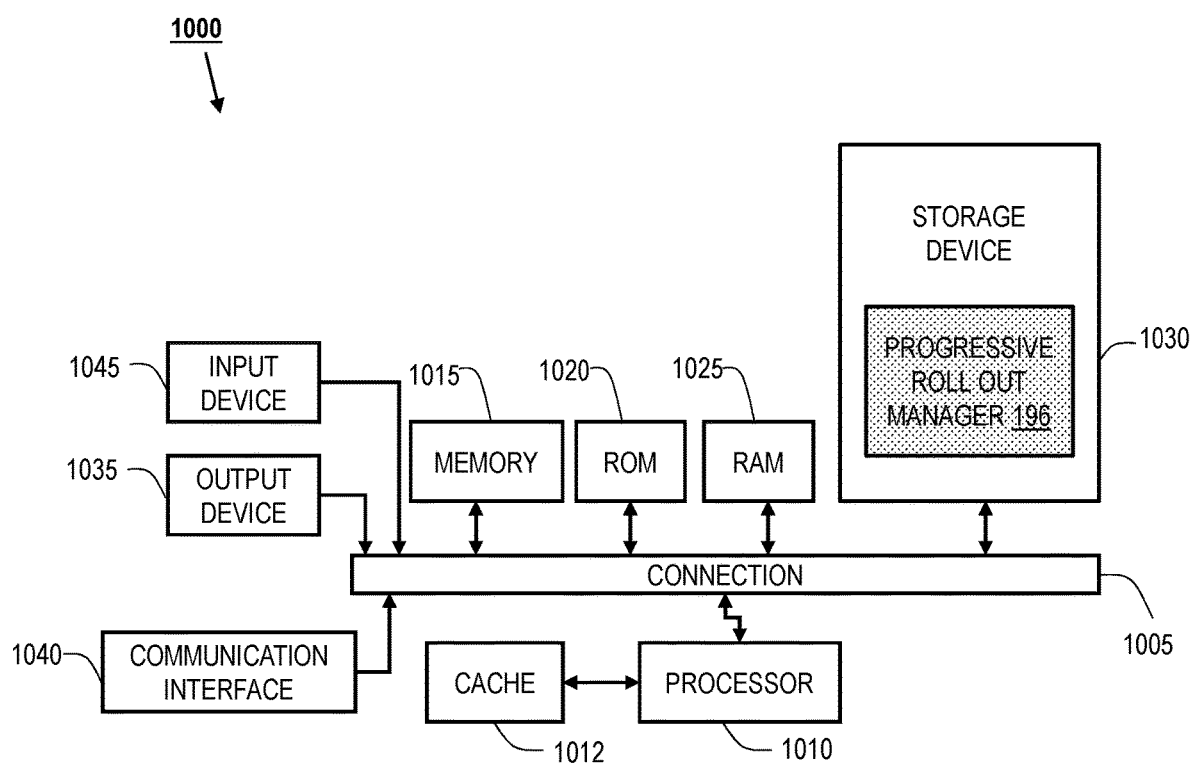
FIG. 10 illustrates an exemplary processor-based system with which some aspects of the subject technology may be implemented.

FIG. 10 illustrates an exemplary processor-based system with which some aspects of the subject technology may be implemented. For example, processor-based system 1000 may be any computing device making up, or any component thereof in which the components of the system are in communication with each other using connection 1005. Connection 1005 may be a physical connection via a bus, or a direct connection into processor 1010, such as in a chipset architecture. Connection 1005 may also be a virtual connection, networked connection, or logical connection.

In some embodiments, computing system 1000 represents the local computing device 110 of FIG. 1 and/or the parts of cluster infrastructure 176 of FIG. 1. In some embodiments, one or more of the described system components represents many such components each performing some or all of the function for which the component is described. In some embodiments, the components may be physical or virtual devices.

Exemplary system 1000 includes at least one processing unit (e.g., a CPU or another suitable processor) 1010 and connection 1005 that couples various system components including system memory 1015, such as Read-Only Memory (ROM) 1020 and Random-Access Memory (RAM) 1025 to processor 1010. Computing system 1000 may include a cache of high-speed memory 1012 connected directly with, in close proximity to, or integrated as part of processor 1010.

Processor 1010 may include any general-purpose processor and a hardware service or software service, such as executable instructions that implement functionalities such as methods and processes described herein. The functionalities carried out by progressive roll out manager 196 may be encoded as instructions in storage device 1030. Processor 1010 may be a completely self-contained computing system, containing multiple cores or processors, a bus, memory controller, cache, etc. A multi-core processor may be symmetric or asymmetric.

To enable user interaction, computing system 1000 includes an input device 1045, which may represent any number of input mechanisms, such as a microphone for speech, a touch-sensitive screen for gesture or graphical input, keyboard, mouse, motion input, speech, etc. Computing system 1000 may also include output device 1035, which may be one or more of a number of output mechanisms known to those of skill in the art. In some instances, multimodal systems may enable a user to provide multiple types of input/output to communicate with computing system 1000. Computing system 1000 may include communications interface 1040, which may generally govern and manage the user input and system output. The communication interface may perform or facilitate receipt and/or transmission of wired or wireless communications via wired and/or wireless transceivers.

Storage device 1030 may be a non-volatile and/or non-transitory and/or computer-readable memory device and may be a hard disk or other types of computer-readable media which may store data that are accessible by a computer.

Storage device 1030 may include software services, servers, services, etc., that when the code that defines such software is executed by the processor 1010, it causes the system 1000 to perform a function. In some embodiments, a hardware service that performs a particular function may include the software component stored in a computer-readable medium in connection with the necessary hardware components, such as processor 1010, connection 1005, output device 1035, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices may be any available device that may be accessed by a general-purpose or special-purpose computer, including the functional design of any special-purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

SELECT EXAMPLES

Example 1 is a computer-implemented method to progressively roll out an update to a plurality of clusters, comprising: (a) generating a sorted list of order values assigned to clusters; (b) setting a current cluster order value to an order value in a first position of the sorted list of order values; (c) performing an update to one or more clusters having the current cluster order value; (d) determining if the update to the one or more clusters having the current cluster order value was successful; (e) in response to determining the update to the one or more clusters having the current cluster order value was successful, setting current cluster order value to a further order value in a second position of the sorted list of order values; and repeating the (c), (d), and (e) until there are no further order values in the sorted list of order values.

In Example 2, the computer-implemented method of Example 1 can optionally include determining if the update to the one or more clusters having the current cluster order value was successful comprising: determining that the update to the one or more clusters having the current cluster order value was successful in response to logs of the one or more clusters meeting one or more performance metrics.

In Example 3, the computer-implemented method of Example 1 or 2 can optionally include determining if the update to the one or more clusters having the current cluster order value was successful comprising: determining that the update to the one or more clusters having the current cluster order value was successful in response to the one or more clusters passing one or more functional tests.

In Example 4, the computer-implemented method of any one of Examples 1-3 can optionally include determining if the update to the one or more clusters having the current cluster order value was successful comprising: allowing a bake time to lapse after the update was performed; and in response to an expiration of the bake time, evaluating the one or more clusters having the current cluster order value against one or more success criteria.

In Example 5, the computer-implemented method of Example 4 can optionally include the bake time being configurable by a user.

In Example 6, the computer-implemented method of any one of Examples 1-3 can optionally include determining if the update to the one or more clusters having the current cluster order value was successful comprising: evaluating, during a bake time, the one or more clusters having the current cluster order value against one or more success criteria; and in response to an expiration of the bake time and repeated successful evaluations during the bake time, determining that the update to the one or more clusters having the current cluster order was successful.

In Example 7, the computer-implemented method of Example 6 can optionally include the bake time being configurable by a user.

In Example 8, the computer-implemented method of any one of Examples 1-7 can optionally include: in response to determining the update to the one or more clusters having the current cluster order value was successful, setting a ready property of the one or more clusters having the current cluster order value to a ready value.

In Example 9, the computer-implemented method of any one of Examples 1-8 can optionally include the plurality of clusters comprising: a first cluster having one or more platforms implemented thereon to support a fleet of driverless autonomous vehicles; and a second cluster having one or more platforms implemented thereon to support a fleet of autonomous vehicles with drivers.

In Example 10, the computer-implemented method of Example 9 can optionally include: the first cluster has a first order value; the second cluster has a second order value different from the first order value; and the first order value and the second order value cause an update to be performed on the second cluster before the first cluster receives an update.

In Example 11, the computer-implemented method of any one of Examples 1-8 can optionally include the plurality of clusters comprises: a first cluster having one or more platforms implemented thereon to support a first operational design domain; and a second cluster having one or more platforms implemented thereon to support a second operational design domain.

In Example 12, the computer-implemented method of Example 11 can optionally include the first cluster has a first order value; the second cluster has a second order value different from the first order value; and the first order value and the second order value cause an update to be performed on the second cluster before the first cluster receives an update.

In Example 13, the computer-implemented method of any one of Examples 1-12 can optionally include the update comprising a change in a manifest of a platform deployed on each one of the clusters.

In Example 14, the computer-implemented method of any one of Examples 1-13 can optionally include the update comprising a change in a configuration setting of each one of the clusters.

In Example 15, the computer-implemented method of claim 1, wherein performing the update to the one or more clusters having the current cluster order value comprises: for a given cluster of the one or more clusters having the current cluster order value: determining a tree of custom resources for the given cluster; and reconciling individual custom resources to match respective desired states by traversing through the tree.

Example 16 is a computer-implemented method to progressively roll out an update to a plurality of clusters, comprising: receiving an update specification, wherein the update specification comprises a desired state definition of the update; updating a deliveries custom resource to track progress of a progressive roll out of the update; reconciling further custom resources corresponding to the clusters against the desired state definition to apply the update to the clusters, in an order that respects order values of the clusters; and repeatedly reconciling, by a controller, the deliveries custom resource against a real-world state of the clusters.

In Example 17, the computer-implemented method of Example 16 can optionally include the update specification including identification of target clusters to apply the update.

In Example 18, the computer-implemented method of Example 16 or 17 can optionally include receiving the order values to be assigned to the clusters from a user.

In Example 19, the computer-implemented method of any one of Examples 16-18 can optionally include providing, to a user, status information of the progressive roll out of the update using the deliveries custom resource.

In Example 20, the computer-implemented method of any one of Examples 16-19 can optionally include receiving, from a user, one or more success criteria for the progressive roll out of the update to progress to one or more clusters having a next order value.

In Example 21, the computer-implemented method of any one of Examples 16-20 can optionally include receiving, from a user, a bake time for the progressive roll out of the update to progress to one or more clusters having a next order value.

In Example 22, the computer-implemented method of any one of Examples 16-21 can optionally include receiving, from a user, one or more performance metrics to be met for the progressive roll out of the update to progress to one or more clusters having a next order value.

In Example 23, the computer-implemented method of any one of Examples 16-22 can optionally include receiving, from a user, one or more functional tests to be performed for the progressive roll out of the update to progress to one or more clusters having a next order value.

In Example 24, the computer-implemented method of any one of Examples 16-23 can optionally include the update comprising a change in a manifest of a platform deployed on each one of the clusters.

In Example 25, the computer-implemented method of any one of Examples 16-24 can optionally include the update comprising a change in a configuration setting of each one of the clusters.

Example 26 is a computer-implemented method to progressively roll out an update to a plurality of clusters, comprising: updating a deliveries custom resource to track progress of a progressive roll out of the update, wherein the deliveries custom resource is defined by the following: a map of the clusters grouped by order values corresponding to the clusters, an ordered list of the order values of the map of clusters; and a current order value; querying the deliveries custom resource to evaluate if a reconciliation request of a first cluster to against a desired state definition should be performed, wherein the first cluster has a first order value; and in response to determining that the reconciliation request should be performed, identifying one or more clusters having the same order value as first order value based on the deliveries custom resource; and triggering the reconciliation request to be performed to one or more identified clusters to apply the update to the one or more identified clusters.

In Example 27, the computer-implemented method of Example 26 can optionally include: in response to determining that the reconciliation request should not be performed, returning a no-operation message.

In Example 28, the computer-implemented method of Example 26 or 27 can optionally include querying the deliveries custom resource to evaluate if the reconciliation request of the first cluster should be performed comprising: determining that the reconciliation request should be performed if the first order value matches the current order value of the deliveries custom resource; and determining that the reconciliation request should not be performed if the first order value does not match the current order value of the deliveries custom resource.

In Example 29, the computer-implemented method of any one of Examples 26-28 can optionally include in response to determining that the reconciliation request of the first cluster was successful, setting a ready property of the first cluster in the deliveries custom resource having the current order value to a ready value.

Example 30 is a system deployed on cluster infrastructure to progressively roll out an update to a plurality of clusters within the cluster infrastructure, comprising: one or more worker nodes having computing and memory resources, wherein the one or more worker nodes have the following deployed thereon: a roll out controller to: reconcile a deliveries custom resource that tracks state of a progressive roll out of the update; trigger reconciliation requests of cluster custom resources against an update specification of the update to be performed in accordance with order values corresponding to the clusters within the cluster infrastructure; and update the deliveries custom resource in response to successful completion of the reconciliation requests; controllers to: perform the reconciliation requests to update the clusters; and one or more pods on the one or more worker nodes to: evaluate whether the reconciliation requests are completed successfully.

In Example 31, the system of Example 30 can optionally include the deliveries custom resource comprising a map of the clusters grouped by order values corresponding to the clusters, an ordered list of the order values of the map of clusters; and a current order value.

In Example 32, the system of Example 30 or 31 can optionally include the one or more pods comprising: a pod to evaluate logs of a cluster on which an update has been performed against one or more performance metrics.

In Example 33, the system of any one of Examples 30-32 can optionally include the one or more pods comprising: a pod to perform functional tests of a cluster on which an update has been performed.

In Example 34, the system of any one of Examples 30-33 can optionally include the one or more pods comprising a pod to: allow a bake time to lapse after an update was performed on a cluster; and in response to an expiration of the bake time, evaluate the cluster against one or more success criteria.

In Example 35, the system of any one of Examples 33-34 can optionally include the one or more pods comprising: a pod to: evaluate, during a bake time, a cluster on which an update has been performed against one or more success criteria; and in response to an expiration of the bake time and repeated successful evaluations during the bake time, determine that the update was successful.

Example A is a computing system, comprising: one or more processors; one or more storage devices to store instructions executable by the one or more processors; and one or more components (e.g., progressive roll out manager 196) encoded in the instructions to perform any one of the computer-implemented methods in Examples 1-29.

Example B has one or more non-transitory computer-readable medium having instructions stored thereon, that when executed by one or more processors, cause the one or more processors to perform any one of the computer-implemented methods in Examples 1-29.

Example C is an apparatus comprising means to carry out or perform any one of the computer-implemented methods in Examples 1-29.

What is claimed is:

1. A computer-implemented method to progressively roll out an update to a plurality of clusters, comprising:
receiving an update specification, wherein the update specification comprises a desired state definition of the update;
updating a deliveries custom resource to track progress of a progressive roll out of the update;
reconciling further custom resources corresponding to the clusters against the desired state definition of the update to apply the update to the clusters, in an order that respects order values of the clusters; and
repeatedly reconciling, by a controller, the deliveries custom resource against a real-world state of the clusters.

2. The computer-implemented method of claim 1, wherein the update specification includes identification of target clusters to apply the update.

3. The computer-implemented method of claim 1, further comprising:
receiving the order values to be assigned to the clusters from a user.

4. The computer-implemented method of claim 1, further comprising:
providing, to a user, status information of the progressive roll out of the update using the deliveries custom resource.

5. The computer-implemented method of claim 1, further comprising:
receiving, from a user, one or more success criteria for the progressive roll out of the update to progress to one or more clusters having a next order value.

6. The computer-implemented method of claim 1, further comprising:
receiving, from a user, a bake time for the progressive roll out of the update to progress to one or more clusters having a next order value.

7. The computer-implemented method of claim 1, further comprising:
receiving, from a user, one or more performance metrics to be met for the progressive roll out of the update to progress to one or more clusters having a next order value.

8. The computer-implemented method of claim 1, further comprising:
receiving, from a user, one or more functional tests to be performed for the progressive roll out of the update to progress to one or more clusters having a next order value.

9. The computer-implemented method of claim 1, wherein the update comprises a change in a manifest of a platform deployed on each one of the clusters.

10. The computer-implemented method of claim 1, wherein the update comprises a change in a configuration setting of each one of the clusters.

11. A computer-implemented method to progressively roll out an update to a plurality of clusters, comprising:
updating a deliveries custom resource to track progress of a progressive roll out of the update, wherein the deliveries custom resource is defined by the following: a map of the clusters grouped by order values corresponding to the clusters, an ordered list of the order values of the map of clusters; and a current order value;
querying the deliveries custom resource to evaluate if a reconciliation request of a first cluster to against a desired state definition should be performed, wherein the first cluster has a first order value; and
in response to determining that the reconciliation request should be performed,
identifying one or more clusters having the same order value as first order value based on the deliveries custom resource; and
triggering the reconciliation request to be performed to one or more identified clusters to apply the update to the one or more identified clusters.

12. The computer-implemented method of claim 11, further comprising:
in response to determining that the reconciliation request should not be performed, returning a no-operation message.

13. The computer-implemented method of claim 11, wherein querying the deliveries custom resource to evaluate if the reconciliation request of the first cluster should be performed comprises:
determining that the reconciliation request should be performed if the first order value matches the current order value of the deliveries custom resource; and
determining that the reconciliation request should not be performed if the first order value does not match the current order value of the deliveries custom resource.

14. The computer-implemented method of claim 11, further comprising:
in response to determining that the reconciliation request of the first cluster was successful, setting a ready property of the first cluster in the deliveries custom resource having the current order value to a ready value.

15. A system deployed on cluster infrastructure to progressively roll out an update to a plurality of clusters within the cluster infrastructure, comprising:
one or more worker nodes having hardware computing and memory resources, wherein the one or more worker nodes have the following deployed thereon:
a roll out controller to:
reconcile a deliveries custom resource that tracks state of a progressive roll out of the update;
trigger reconciliation requests of cluster custom resources against an update specification of the update to be performed in accordance with order values corresponding to the clusters within the cluster infrastructure; and
update the deliveries custom resource in response to successful completion of the reconciliation requests;
controllers to:
perform the reconciliation requests to update the clusters; and
one or more pods on the one or more worker nodes to:
evaluate whether the reconciliation requests are completed successfully.

16. The system of claim 15, wherein the deliveries custom resource comprises a map of the clusters grouped by order values corresponding to the clusters, an ordered list of the order values of the map of clusters; and a current order value.

17. The system of claim 15, wherein the one or more pods comprises:
a pod to evaluate logs of a cluster on which an update has been performed against one or more performance metrics.

18. The system of claim 15, wherein the one or more pods comprises:
a pod to perform functional tests of a cluster on which an update has been performed.

19. The system of claim 15, wherein the one or more pods comprises:
- a pod to:
  - allow a bake time to lapse after an update was performed on a cluster; and
  - in response to an expiration of the bake time, evaluate the cluster against one or more success criteria.

20. The system of claim 15, wherein the one or more pods comprises:
- a pod to:
  - evaluate, during a bake time, a cluster on which an update has been performed against one or more success criteria; and
  - in response to an expiration of the bake time and repeated successful evaluations during the bake time, determine that the update was successful.

\* \* \* \* \*